Figure 1:
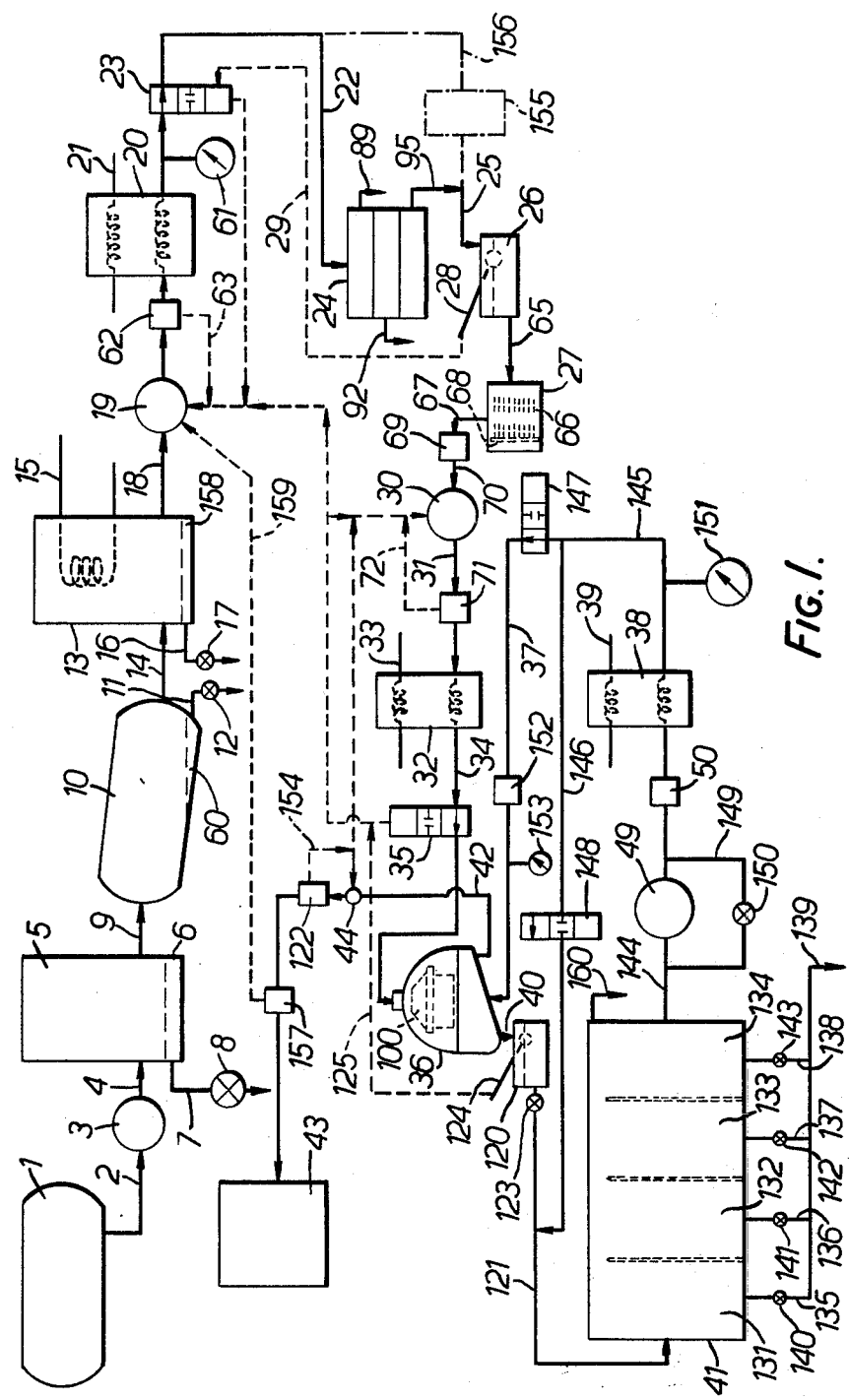

United States Patent [19]

Owen

[11] 4,272,359

[45] Jun. 9, 1981

[54] METHOD AND APPARATUS FOR RE-PROCESSING WASTE OIL

[75] Inventor: Robert G. F. Owen, Poole, England

[73] Assignee: Waste Lubricating Oils Limited, Tunstall, England

[21] Appl. No.: 92,731

[22] Filed: Nov. 9, 1979

[30] Foreign Application Priority Data

Nov. 13, 1978 [GB] United Kingdom ............... 44231/78
Jul. 20, 1979 [GB] United Kingdom ............... 25384/79

[51] Int. Cl.³ ............................................. C10M 11/00
[52] U.S. Cl. ..................................... 208/179; 196/46; 196/46.1; 210/806
[58] Field of Search ................. 208/179, 181, DIG. 1; 196/46, 46.1

[56] References Cited

U.S. PATENT DOCUMENTS

| | | | |
|---|---|---|---|
| 1,698,257 | 1/1929 | Cherry | 208/179 |
| 2,952,624 | 9/1960 | Lister et al. | 208/179 |
| 3,972,779 | 8/1976 | Harrison | 208/33 |

*Primary Examiner*—Brian E. Hearn
*Attorney, Agent, or Firm*—Cushman, Darby & Cushman

[57] ABSTRACT

A method of and apparatus for re-processing waste oil for the production of a fuel oil substitute are described. The waste oil is passed first to a solids separation zone and then to a three phase separator in which the oil is intimately contacted with water. The plant is preferably operated continuously and the rate of supply of waste oil to the solids separation zone is controlled in dependence on the water content of the oil product from the three phase separator. A system of level controls and pressure switches is described which provide for automatic shut down of the plant in the event of "seal loss" in the separator or other malfunction of the plant.

15 Claims, 3 Drawing Figures

METHOD AND APPARATUS FOR RE-PROCESSING WASTE OIL

METHOD AND APPARATUS

This invention relates to a method for re-processing waste oil, to apparatus suitable therefor, and to the products of such a method and apparatus.

Every country throughout the world accumulates used hydrocarbon oil, that is to say oil that is not destroyed in its first life. Such used oil is mainly represented by waste lubricating and industrial process oils. It is conservatively estimated that in Britain alone there are produced approximately 400,000 tonnes per annum (450 million liters per annum). In a number of countries there exist oil re-processing industries. In the United Kingdom some 250,000 tonnes per annum (280 million liters per annum) are recovered by the oil re-processing industry, it is estimated.

Conventionally waste oil is re-processing in one of three ways:

1. Selection of good quality oil followed by re-distillation to give a low quality base stock for blending;
2. Collection of specific grades of oil, followed by "laundering" for return to the consumer to his specification for a similar use to the original oil;
3. Collection of a wide variety of used oils, followed by refining and blending to produce a fuel oil substitute, comparable to a 35 sec. gas oil in performance, yet costing substantially less.

For a variety of economic, social and political reasons there is a requirement, or at least the desire, to conserve hydrocarbon stocks in many countries. Ideally lubricating oil should be continually recycled as such and not destroyed. However it is not practical on technological or economic grounds to achieve this end with a large proportion of the waste oil currently produced. Hence the next best course is to use it as a fuel oil in its second life.

Various authors have made proposals for re-processing used lubricating oils used in, for example marine engines, to enable return of the re-processed waste oil to the engine. For example, British Pat. No. 233334 and U.S. Pat. No. 1778831 describe a process in which used lubricating oil is mixed with water at low temperature to induce sludge formation and the resulting mixture is centrifuged to separate the sludge from a purified oil which can be returned to the lubricating system. If desired, the purified oil can be heated somewhat and re-centrifuged. A similar process is described in British Pat. No. 279636; this involves continuously agitating water and the oil to be treated in a tank followed by centrifuging the resulting mixture. British Pat. No. 409522 discloses a process in which used or waste resistance oil is centrifuged at 10° to 25° C. and then washed with alkali. The use of a centrifugal separator and purifier for purifying and reclaiming engine lubricating oil for recycle to the engine is described in U.S. Pat. No. 1318086. All of these processes, have, however, utilised as starting material a uniform oil drawn from a particular source and return the oil for reuse in its original role.

Washing of crude fuel oils with water in a three phase separator is commercially practised.

A problem arises, however, with the re-processing on a commercial scale, of waste oils that have been rejected for further use in their original role by industrial users. The re-processor of such waste oils is faced with having to treat a wide variety of oils of unknown composition and varying widely in composition, in viscosity, in additive type and quantity, in water content and in solids content. It is accordingly difficult to find a satisfactory, simple process that can be operated successfully on a commercial scale on such a variable raw material.

There have been prior proposals for treating such waste oils. For example, U.S. Pat. No. 3790474 proposes heating a waste oil to 130° F. to 200° F. (54.4° C. to 93.3° C.), stirring the hot oil with an alkali solution, then stirring the mixture with an acid solution, and allowing the resulting mixed phases to separate. U.S. Pat. No. 3923644 suggests flashing off the water content of the waste oil by heating it to 210°–240° F. (98.9° C. to 115.6° C.) and then filtering the unvaporised liquid. The resulting filtrate can be used as a fuel oil. U.S. Pat. No. 3923643 utilises a heat treatment at 500° to 700° F. (260° C. to 371.1° C.), after first flashing off water and light hydrocarbon material. This heat treatment is said to agglomerate the suspended lead and other solids which can then be separated from the heat treated oil by conventional methods such as centrifuging. Another form of high temperature heat treatment is disclosed in U.S. Pat. No. 4033859; according to this proposal the waste oil is pretreated by heating to above about 400°–800° F. (204.4° C. to 443.3° C.) under a pressure of 500–3500 p.s.i.g. (35.15 to 246.06 kg/cm$^2$ gauge). The resulting product can then be subjected to centrifugation.

Such proposals for treating waste oils require either hazardous high temperature treatments or the use of corrosive chemicals (acids and alkalis).

There is accordingly a need to provide a simple process for treating waste oils to produce a useful product that does not involve either the use of high treatment temperatures or the use of corrosive chemicals.

The present invention accordingly seeks to provide a simple method for re-processing on a commercial scale waste oil, containing possibly significant quantities of water and/or solids, which does not involve the use of hazardous high temperature treatments or corrosive chemicals, whereby thereby may be produced an oil product that has a controlled low content of water and solids and that is suitable for use as a fuel oil. The invention further seeks to provide an apparatus suitable for carrying out such a method.

In accordance with the present invention there is provided a method for re-processing waste oil, possibly containing significant quantities of water and/or solids distributed therein, to produce an oil product having a controlled low water and solids content and suitable for use as a fuel, which method comprises:

(a) providing a solids separation zone;
(b) supplying waste oil to the solids separation zone;
(c) subjecting waste oil in the solids separation zone to conditions conducive to separation of solids therefrom;
(d) recovering from step (c) an intermediate oil product of reduced solids content compared with the waste oil;
(e) contacting intermediate oil product of step (d) with water in a separator;
(f) recovering water phase from the separator;
(g) recovering an oil product from the separator;
(h) monitoring the water content of the oil product of step (g); and (i) controlling the rate of supply of waste oil to the solids separation zone in dependence on the water content of the oil product of step (g), whereby the water content of the oil product of step (g) may be maintained at or below a suitable value permitting use thereof as a fuel.

The solids separation zone may comprise a centrifuge.

In an alternative preferred process the solids separation zone may comprise a sieving machine. Such a machine may incorporate one or more screens of appropriate mesh size; it may further include means for vibrating the screen or screens each at an appropriate frequency to assist in solids separation. The sieves may be of the demountable type; preferably they are of the scroll sieve type so as to permit continuous solids discharge. The sieves may be made of textile material but are preferably made of metal.

As collected from the user, waste oil may contain variable amounts of water and/or solids dispersed therein. A wide variety of waste oils can be treated by the method of the invention, provided that the oil predominantly comprises a hydrocarbon oil. Minor proportions of oils having fuel value, such as vegetable oils (e.g. castor oil) can be tolerated in the waste oil, as can also minor proportions of synthetic oils such as silicone oils. The waste oil should not contain more than about 5% by weight solids, nor more than about 10% by weight moisture in chemical emulsion, nor more than about 25% by weight water in free emulsion. The process is of particular applicability to waste hydrocarbon oils that have been used for lubricating purposes or in industrial processes.

As examples of suitable waste oils that can be re-processed by the method of the invention there can be mentioned automotive oils, such as engine crank case and transmission oils, and industrial oils, such as cutting oils, spindle oil, press oil, drawing oils, hydraulic oils, turbine oils, transformer oil, switchgear oils, refrigerator oils, compressor oils, heat transfer oils and quench oils.

If the water content of the waste oil exceeds about 15% by volume, it is preferred to allow the waste oil to settle under gravity until the water content drops to a satisfactory level, for example below about 15% by volume, prior to commencing treatment. In some cases it is possible to enhance the rate of settlement of dispersed water by heating the waste oil to about 30° C. or more, particularly in cold weather.

It will usually be preferred to heat the waste oil somewhat prior to supply to the solids separation zone, e.g. to a temperature of from about 40° C. to about 70° C. This heating step reduces the viscosity of the waste oil and facilitates solids separation. Heating may be effected in two or more stages. Thus, prior to supply to the solids separation zone the waste oil may be heated (if necessary) to around 20° C. and held at this temperature for a period of, for example, 24 hours to 48 hours, and then after separation from any settled water the oil may be heated to a more elevated temperature in the range of, for example, about 40° C. to about 70° C. and passed at this temperature to the solids separation zone.

The method of the invention is normally operated continuously, i.e. with continuous supply of waste oil to the solids separation zone and with continuous supply of intermediate oil product to the separator.

In one form of the process water phase from step (f) is recycled to the separator. In this way the production of aqueous effluent is minimised. Moreover, in the event of "seal loss" in the separator, the method of the invention can be adapted so that the risk of accidental discharge of an oil/water mixture to the environment is avoided by use of this recycle feature. Hence, it is preferred to monitor the volume of liquid in the recycle loop and to arrange that, in the event of an increase in this volume beyond a predetermined value, e.g. as a result of "sealloss", supply of intermediate oil product to the separator is interrupted until normal operation of the separator is resumed.

It is furthermore preferred to monitor the solids content of the intermediate oil product and to arrange that, in the event of solids breakthrough from the solids separation zone, supply of waste oil to the solids separation zone is interrupted.

The invention further provides apparatus for re-processing waste oil, possibly containing significant quantities of water and/or solids dispersed therein, to produce an oil product having a sufficiently low water and solids content to permit use thereof as a fuel, which apparatus comprises:

(i) solids separation means capable of operation with a continuous liquid feed and including a solids separation zone wherein there may be maintained conditions conducive to separation of solids from waste oil;

(ii) means for continuously recovering from the solids separation means an intermediate oil product of reduced solids content compared with the starting waste oil;

(iii) separator means for effecting intimate contact between intermediate oil product and water;

(iv) means for supplying intermediate oil product to the separator means;

(v) means for supplying water to the separator means;

(vi) means for recovering from the separator means a water phase;

(vii) means for recovering from the separator means an oil product of sufficiently low water and solids content to permit use thereof as a fuel; and (viii) means for supplying waste oil to the solids separation means in dependence on the water content of the oil product, whereby the water content of the oil product may be maintained at a predetermined value permitting use thereof as a fuel.

The solids separation means may comprise a centrifuge.

In an alternative preferred form of apparatus, the solids separation means comprises a sieving machine, preferably of the type discussed above.

In a preferred apparatus the means for supplying waste oil to the solids separation zone comprises a variable speed pump controlled by a continuous water content analyser arranged in the path of the oil product. Preferably the means for supplying water to the separator means comprises means for collecting and recycling water phase recovered from the separator means. The apparatus may further include monitoring means for monitoring the recovery of water phase from the separator and flow control means for controlling the flow of intermediate oil product to the separator connected to the monitoring means, whereby in the event of "seal loss" in the separator means so that oil is discharged together with the water phase from the separator means the resulting increase in flow is detected by the monitoring means which in turn halts the flow of intermediate oil product to the separator means at least until the separator means is again operating normally. There may also be provided sensing means for sensing the flow of intermediate oil product to the separator means and valve means for controlling the flow of waste oil to the solids separation means connected to the sensing means, whereby in the event of interruption of the flow of intermediate oil product downstream from the sensing means the valve means is actuated to shut off the supply of waste oil to the solids separation zone. Respective heating means may be provided for heating (a) the intermediate oil product to be fed to the separator means, (b) the waste oil to be fed to the solids separation zone, and (c) the water to be supplied to the separator means.

The invention extends not only to the method of re-processing waste oil and to the apparatus suitable therefor, but also to the oil products obtained using such a method and/or apparatus.

Figure 2:
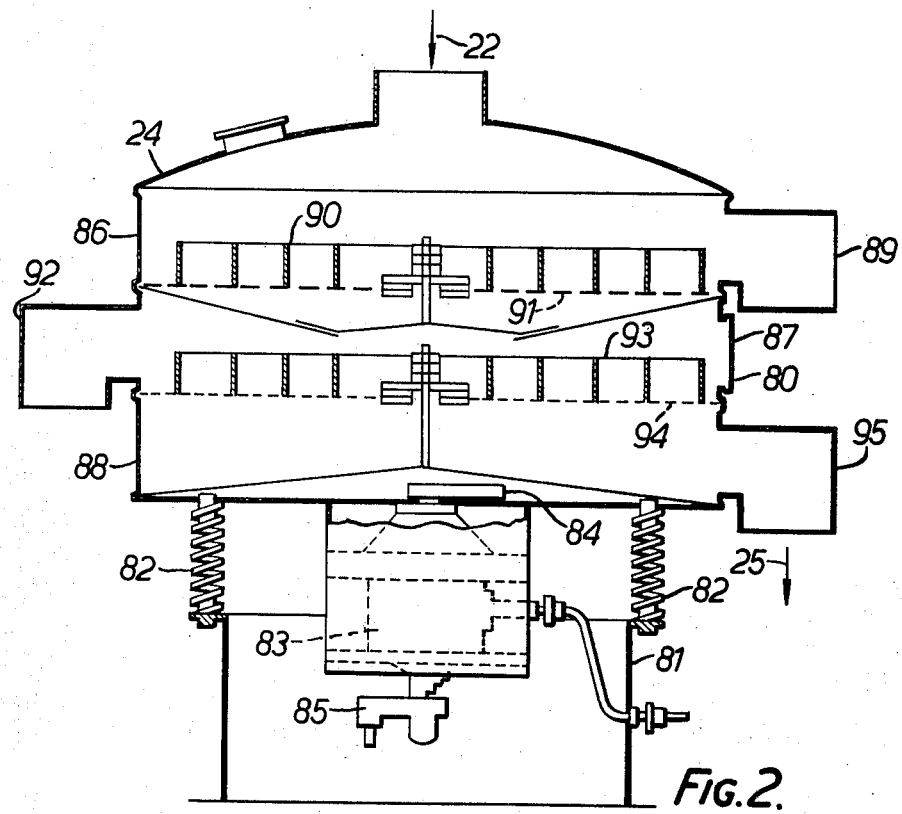
Figure 3:
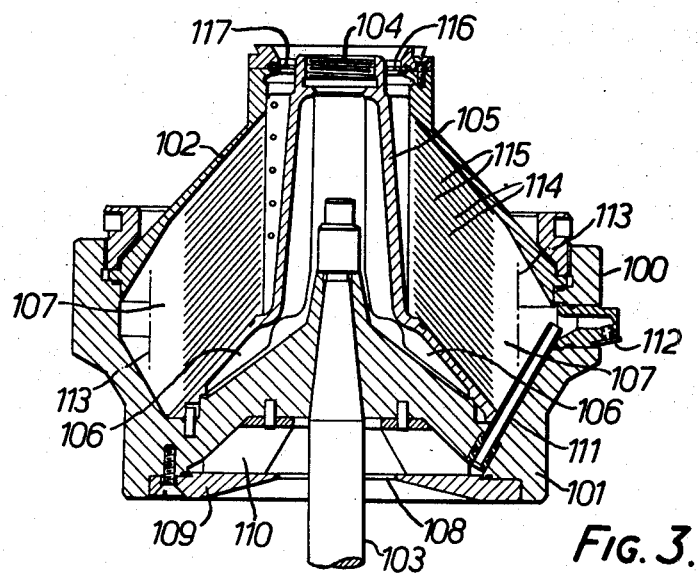

In order that the invention may be clearly understood and readily carried into effect a preferred method, and a preferred form of apparatus (and a modification thereof) according to the invention will now be described, by way of example only, with reference to the accompanying diagrammatic drawings, in which:

FIG. 1 is a flow sheet of a plant for re-processing waste oil constructed according to the invention; and FIGS. 2 and 3 are sections through the sieving machine and through the bowl of the three phase separator respectively, each of which form part of the plant of FIG. 1.

Referring to FIG. 1 of the drawings, reference numeral 1 indicates a tanker in which waste oil is collected for re-processing from industrial premises where waste oil is accumulated. Tanker 1 conveniently has an overall capacity in the range of from about 8200 liters to about 11500 liters. It may have a single tank for reception of waste oil, but preferably has a plurality of such tanks, e.g. 3 or more, thus enabling the driver to segregate waste oils of different type. Since the waste oils may contain solids dispersed therein, tanker 1 is provided with a pump (not shown) of a type which can handle solids of up to about 7 mm in particle size and which is driven by power take off from the vehicle's gear box via a torque limiting device to minimise risk of damage to pump or vehicle in the event of jamming of the pump. The pump is also protected by a coarse filter (not shown) in the suction line for the waste oil and by a sump (not shown) in this suction line containing a permanent magnet to trap magnetic particles in the waste oil. The vehicle is further provided with a variety of fittings, filters and pipes to enable collection of waste oil from storage tanks or from barrels. A dipstick or other form of liquid level gauge is provided for measuring the liquid volume in the or each tank of the vehicle.

After collection of a load, any free water present in the bottom of the tank or tanks of tanker 1 is discharged under gravity back at the depot. Thereafter a sample is taken from the or each tank of the vehicle and this is tested for water content, solids content and viscosity. The oil is then discharged from tanker 1 via line 2, coarse filter 3 and line 4 to a dump tank 5. Although only a single dump tank 5 is shown in FIG. 1, several may be used in practice in order to keep different types of waste oil segregated. Further water may settle out in dump tank 5 as indicated at 6 and is discharged via line 7 and valve 8.

The waste oil passes from dump tank 5 via line 9 to an appropriate one of a number of settlement tanks 10, one of which only is shown in the drawing. The waste oil is retained in settlement tank 10 for a period to allow further settlement of water and of solids. As can be seen from FIG. 1 the longitudinal axis of settlement tank 10 is inclined at a small angle (e.g. about 1° to about 5°) in order to assist in settlement of water and solids and their withdrawal. (This angle of inclination is exaggerated in FIG. 1 for the sake of clarity). Generally speaking, if the water content of the oil at this stage exceeds about 15% by volume, it is desirable to retain it in tank 10 until the water content has fallen to a value in the range of from about 10% to about 15% by volume. The time required for this may vary from a few hours or days up to several months, depending on the ambient temperature and on the nature of the waste oil concerned. Periodically samples of the oil are taken from tank 10 and tested for water and solids content. Water that settles out in tank 10 can be removed via line 11 using valve 12. Such water is indicated at 60 in FIG. 1. From time to time, typically every 6 months or so, the settlement tanks 10 are taken out of service in turn for cleaning in order to remove settled solids material. These solids can be incinerated to minimise pollution.

After the water content of the waste oil has achieved a satisfactory level, e.g. 10% to 15% by volume, it is transferred to one of a number of pre-process storage tanks 13 (only one of which is shown in FIG. 1) via line 14. Waste oil from a number of different settlement tanks 10 can be blended in a particular tank 13 to achieve a desirable balance of properties of the feedstock from the available waste oils that have been collected. The contents of each pre-process storage tank 13 can be heated by means of heater coil 15 through which a suitable heat exchange medium, e.g. hot water or steam, can be circulated. In this way the temperature of the contents of tank 13 can be brought to about 20° C. when the ambient temperature is lower than this value, e.g. in winter. Typically the waste oil is held in tank 13 for about 24 to about 48 hours to allow further settlement of solids and water. Water 158 that collects in tank 13 can be drained off by means of line 16 and valve 17.

From tank 13 the waste oil is passed by means of a corresponding line 18 and a variable speed pump 19 to an initial pre-heater 20 in which it is heated to a temperature typically in the range of from about 40° C. to about 70° C., at which the viscosity is sufficiently reduced for the oil to pass freely through the downstream processing stages. Usually this temperature will be at least about 50° C. The temperature of the oil emerging from pre-heater 20 is monitored by temperature gauge 61. Reference numeral 21 indicates a heat exchanger coil through which hot water, steam or other heat exchange fluid can be passed. If desired the contents of two or more different tanks 13 can be blended for passage to pre-heater 20 by manipulation of appropriate valves (not shown) in the lines 18 which join upstream from pump 19. Pump 19 is protected by means of a pressure switch 62 to which it is connected by means of control line 63. In the event of a blockage downstream from switch 61, the pressure in line 18 will rise and will trigger switch 62 to deactivate pump 19.

The pre-heated oil then passes via line 22 through a solenoid-controlled valve 23 to a sieving machine 24 in which the oil is passed in turn through a 60 mesh metal screen and then through a 250 mesh metal screen. The construction and operation of sieving machine 24 will be described in more detail below in relation to FIG. 2 of the drawings. Approximately 98% of all solid particles down to 10 microns are removed by means of sieving machine 24. Solids are continuously discharged from the machine as indicated by lines 89 and 92.

Sieving machine 24 is shown in more detail in FIG. 2 and comprises a screening assembly 80 mounted on a base 81 by means of springs 82 which allow the assembly 80 to vibrate freely whilst preventing vibration reaching the floor area on which the machine stands. Beneath and supported by screening assembly 80 is a motor 93 on whose vertical shaft are mounted upper and lower eccentric weights 84 and 95 respectively. By adjusting the radial positions of these eccentric weights relative to one another on the motor shaft, the pattern of vibrational movement of assembly 80 can be altered. In practising the present invention the weights 84 and 85 are preferably adjusted so that vertical movement is pronounced compared with horizontal vibrational movements. Typically motor 83 rotates at a speed of approximately 1700 rpm.

Screening assembly 80 comprises a pair of frames 86 and 87 mounted one above the other on top of a bottom frame 88. Top frame 86 has a discharge spout 89 for solids and is fitted with a scroll 90 and a 60-mesh (British Standard Sieve) screen 91. Middle frame 87 has a discharge spout 92 and is fitted with a scroll device 93 and a 250-mesh (British Standard Sieve) screen 94. Bottom frame 88 is fitted with a discharge spout 95 for the intermediate oil product. As screening assembly 80 is vibrated the oil passes through screens 91 and 94; the vertical component of the vibration helps to keep screens 91 and 94 unblocked, whilst the horizontal vibrational components together with the scroll devices 90 and 93 result in radial outward movement of separated particulate matter which is discharged as a sludge via discharge spouts 89 and 92. The resulting intermediate oil product is discharged from sieving machine 24 through spout 95 and line 25 into a break tank 26, which discharges through line 65 and a knife-edged filter 27. Filter 27 serves to monitor the solids size in the intermediate oil product and comprises a stack of annular discs 66, each separated from the next by a small gap; oil to be filtered is supplied to the outside of the stack whilst the filtered oil is removed axially of the top of the stack through line 67. (It will be appreciated that the spacing between adjacent discs 66 is greatly exaggerated in FIG. 1 for the sake of clarity). Accumulated solids can be removed from the outside of the stack of discs 66 by means of a scraper blade 68 which is rotatable about or in close proximity to the periphery of the discs 66. Should sieving machine 24 cease to carry out its function, filter 27 will block, the level of oil will build up in tank 26 and a level control 28 will operate to close solenoid valve 23 to which it is linked by means of control line 29. Line 67 leads to an optional in-line analyser 69 for determining the water content of the intermediate oil product; this analyser measures continuously the specific gravity of the intermediate oil product at the operating temperature and, after calibration for the type of oil being treated, permits a direct readout of the water content to be displayed. Preferably samples of intermediate oil product are taken periodically from tank 26 and are analysed to monitor water content (Method I.P. 74/70 published by the Institute of Petroleum) and to provide calibration figures for the analyser 69 (if fitted).

A pump 30 is used to transfer intermediate oil product from tank 26 via filter 27, analyser 69, line 70 and line 31 to a heat exchanger 32 in which it is heated by means of heat exchanger coil 33 to a suitable temperature for the subsequent processing step, typically in the range of from about 60° C. to about 80° C., e.g. about 70° C. Pump 30 is protected by means of a pressure switch 71 in line 31; switch 71 is connected to the motor of pump 30 by control line 72. The hot intermediate oil product passes on from heat exchanger 32 via line 34 through a solenoid-controlled valve 35 to a disc-type three phase separator/purifier 36, operating at a speed of approximately 8000 r.p.m. This is described more fully below in relation to FIG. 3. Separator 36 is supplied continuously via line 37 with water which is also preheated (e.g. to about 70° C.) in heat exchanger 38 so as to avoid cooling in separator 36. Heat exchanger 38 has a heating coil 39 through which a suitable heat exchange medium, e.g. hot water or steam, may be passed.

Referring now to FIG. 3 of the drawings, the bowl 100 of separator 36 comprises a lower housing 101 and an upper cover 102 and is mounted on a vertical spindle 103 for rotation at high speed (e.g. 8000 r.p.m.) about a vertical axis. The drive arrangement is not shown. Oil to be treated is fed into the open top 104 of centre tube 105, which is flared outwardly and downwardly at its lower end, through passages 106 and out into space 107 through apertures (not shown) at the bottom of the outwardly flared end of centre tube 105. Water is fed to the bottom end of the bowl 100 through the annular gap 108 between spindle 103 and a bottom ring dam 109. By means of recycle water impellor 110 water is fed through recycle tubes 111 (of which there are eight in number regularly spaced around the periphery of the bowl 100). Water flows out from bowl 100 through nozzles 112 (of which there are eight, regularly spaced around the periphery of the bowl), taking with it solid particles present in the oil feed as well as water-soluble dissolved solids. Reference numeral 113 indicates the vertical cylindrical water/oil interface. A stack of closely spaced frusto-conical discs 114 (the spacing between which is exaggerated for clarity in FIG. 3) is mounted around centre tube 105. Oil flows from space 107 into the passages 115 between discs 114 and is discharged from the bowl through an annular gap 116 formed between top ring dam 117 and the centre tube 105.

The position of interface 113 within the centrifuge bowl 100 is determined by the ratio between the specific gravities of the water and oil at the treatment temperature (e.g. 70° C.) and by the ratio between the feed rates of oil and water. This latter feed rate ratio can be adjusted by selecting ring dams 109 and 116 of appropriate size. In practice the rate of supply of water through line 37 exceeds the desired rate of flow through the aperture 108; the excess water is allowed to flow on and out from the separator 36 via line 40.

On passage through separator 36 the intermediate oil product is subjected to a centrifugal force of about 9000 g. The washing step with water in separator 36 serves to extract solids and further dispersed water from the intermediate oil product. Contaminated water is discharged through line 40 to break tank 120 and thence via line 121 to settlement tank 41, whilst purified oil is discharged through line 42 and pumped to storage tank 43 using pump 44 which is protected by by means of pressure switch 122 to which it is connected via control line 154. En route to storage tank 43 from separator 36 the oil is advantageously cooled to recover heat. Conveniently the oil flow in pipe 42 can be passed through coil 15 to heat the contents of tank 13. From storage tank 42 the end product oil can be withdrawn for delivery by road tanker or rail tanker to the customer as heating oil.

Break tank 120 has a capacity of about 20 liters and is fitted with an adjustable outlet valve 123 and a level switch 124 which is connected by means of control line 125 to air-operated solenoid valve 35.

In separator 36 a situation known as "seal loss" can occur if for some reason conditions arise whereby oil and water fail to separate satisfactorily. In this event oil is discharged with the contaminated water via line 40. Hence a larger volume than usual of liquid (i.e. water plus oil) flows in line 40 resulting in an increase in liquid level in break tank 120. Liquid level switch 124 thereupon comes into play by shutting valve 35 to which it is linked by control line 125. Because oil flow in line 34 has been stopped oil flow in line 42 also substantially stops. Simultaneously pressure switch 71 will act via control line 72 to stop pump 30. However a water-oil mixture will continue to circulate between separator 36 and tank 41 until the phase disengagement situation in separator 36 has been resolved and oil is no longer discharged in line 40. Thereupon level switch 124 will act to reopen valve 35.

Closure of valve 35 in response to a rise of liquid level in break tank 120 also causes the liquid level to rise in tank 26, whereupon level control 28 acts to close valve 23 via control line 29. This in turn will cause pressure switch 62 to act via control line 63 to stop pump 19. Upon reopening of valve 35 pressure switch 71 will allow pump 30 to re-start and the level in tank 26 will then fall, thereby causing level control 29 to act to re-open valve 23. Thereupon pressure switch 62 will allow pump 19 to re-start, thereby permitting operation of the plant to continue as before the interruption.

From break tank 120 the water discharged from separator 36 passes via line 121 to settlement tank 141. This is divided internally by a number of vertical partitions into several compartments 131, 132, 133, 134 and its lower part is generally of V-section. Each compartment is provided with a corresponding off-take pipe 135, 136, 137, 138 connected to a common drain line 139 and is provided with a drain valve 140, 141, 142, 143. In this way solids settling out in tank 41 can be withdrawn as sludge via drain line 139. Oil separating out in tank 41 can be withdrawn via line 160. Water can be recirculated to separator 36 by pump 49 through line 144, heat exchanger 38, line 145 and line 37. Upstream from heat exchanger 38 a basket filter 50 is fitted in line 144. A bypass line 146 enables water to be by-passed around separator 36. Reference numerals 147 and 148 indicate respective solenoid valves in lines 37 and 146 for controlling the flow to the separator 36. A bypass line 149 fitted with a pressure relief valve 150 is arranged to bypass pump 49 so that pump 49 is not damaged in the event that both solenoid valves 147 and 148 are closed. Reference numeral 151 indicates a temperature gauge in line 145. The pressure in line 37 can be reduced by means of a pressure reducing valve 152 and is monitored by means of pressure gauge 153.

As indicated in FIG. 1 by the remaining unnumbered control lines (shown in broken lines), the various flow control devices are all interconnected so that in the event of, for example, failure of solenoid valve 23 to close in response to level control 28 one of the other downstream cutout devices will act to stop pump 19.

In a modification of the plant of FIG. 1 sieving machine 24 is replaced by a centrifuge 155 in line 156 connecting solenoid valve 23 and tank 26.

In operation of the plant the first step at start up is to circulate water from tank 41 through heat exchanger 38 and line 146 until the desired operating temperature is reached. Simultaneously heat exchangers 13, 20 and 32 are used to heat the waste oil to be treated to the desired temperature. Once the correct temperatures are attained valve 148 is shut, valve 147 is opened and pump 19 is switched on so as to feed waste oil first to the sieving machine 24 and then to separator 36. Once the plant is operating stably the oil product in line 42 is sampled periodically or continuously and tested for water content, solids content and viscosity. An in-line water content analyser 157 of the type described above is provided in line 42 for this purpose. Alternatively samples can be analysed periodically by Method I.P. 74/70 published by the Institute of Petroleum. The results from such analysis can be used to calibrate the analysers 69 (if fitted) and 157. The rate at which the waste oil passes through the plant is so controlled that the water content of the end product oil is acceptably low, typically in the range of from 0 to about 3% by volume. Control of this flow is achieved by adjustment of the rate of pumping of variable speed pump 19. If an in-line water content analyser 157 is fitted in line 42 this can be used to regulate the pumping rate of pump 19 automatically as indicated by control line 159.

If the oil product in line 42 is not of the desired viscosity it can be blended with other fractions prior to delivery to the customer. A suitable viscosity is about 200 to about 240 seconds (Redwood No. 1).

Using the method described with reference to the drawings, it is readily possible to produce from a suitable waste oil or blend of waste oils an oil product suitable for use as a fuel oil substitute and having the following characteristics:

| | |
|---|---|
| Viscosity | 200–240 seconds Redwood No. 1 |
| Calorific value (net) | 10360 kcal/kg |
| Specific gravity | 0.89 |
| Sulphur | 0.4% by weight |
| Solids content | Less than 0.04% by weight; less than 10 microns |
| Water content | Less than 3% by volume |
| Ash | 0.5% by weight |
| Pour point | −10° C. |

An example of a fuel oil substitute produced by the method illustrated shows the following analysis:

| | |
|---|---|
| Viscosity at 38° C. | 224 seconds Redwood |
| % Sulphur | 0.36 by weight |
| % Ash | 0.43 by weight |
| % Water | 2.2 by volume |
| Flash point (closed PM) | 168.3° C. |
| % Solids | 0.032 by weight |
| Specific gravity at 16° C. | 0.885 |
| Nickel | 6 ppm |
| Vanadium | 8 ppm |
| Sodium | 17 ppm |
| Lead | 18 ppm |
| Potassium | 13 ppm |
| Calcium | 0.12% by weight |
| Barium | 49 ppm |
| Zinc | 0.09% by weight |
| Phosphorus | 0.06% by weight |

Analysis of the ash gives the following results:

| | |
|---|---|
| % Calcium (as sulphate) | 59 |
| % Zinc (as oxide) | 37.4 |
| Barium | Trace |

| | |
|---|---|
| Potassium | Trace. |

What I claim as my invention and desire to secure by Letters Patent is:

1. A continuous process for re-processing waste oil, possibly containing significant quantities of water and/or solids distributed therein, to produce an oil product having a controlled low water and solids content and suitable for use as a fuel, which method comprises:
   (a) providing a solids separation zone for effecting mechanical separation of solids from a liquid;
   (b) continuously supplying waste oil to the solids separation zone;
   (c) mechanically separating solids from waste oil in the solids separation zone;
   (d) recovering from step (c) an intermediate oil product of reduced solids content compared with the waste oil;
   (e) continuously feeding intermediate oil product to a separator;
   (f) supplying water to the separator;
   (g) contacting intermediate oil product of step (d) with water in the separator;
   (h) recovering water phase from the separator;
   (i) recovering an oil product from the separator;
   (j) monitoring the water content of the oil product of step (i); and
   (k) controlling the rate of supply of waste oil to the solids separation zone in dependence on the water content of the oil product of step (i), whereby the water content of the oil product of step (i) may be maintained at or below a suitable value permitting use thereof as a fuel.

2. A method according to claim 1, wherein the solids separation zone comprises a centrifuge.

3. A method according to claim 1, wherein the solids separation zone comprises a sieving machine.

4. A method according to claim 1 wherein the waste oil is heated prior to supply to the solids separation zone to a temperature in the range of from about 40° C. to about 70° C.

5. A method according to claim 1 wherein water phase from step (f) is recycled to the separator.

6. Apparatus for reprocessing waste oil, possibly containing significant quantities of water and/or solids dispersed therein, to produce an oil product having a sufficiently low water and solids content to permit use thereof as a fuel, which apparatus comprises:
   (i) solids separation means capable of operation with a continuous liquid feed and including a solids separation zone wherein solids may be separated mechanically from waste oil;
   (ii) means for continuously recovering from the solids separation means an intermediate oil product of reduced solids content compared with the starting waste oil;
   (iii) separator means for effecting intimate contact between intermediate oil product and water;
   (iv) means for continuously supplying intermediate oil product to the separator means;
   (v) means for supplying water to the separator means;
   (vi) means for recovering from the separator means a water phase;
   (vii) means for continuously recovering from the separator means an oil product of sufficiently low water and solids content to permit use thereof as a fuel; and
   (viii) means for continuously supplying waste oil to the solids separation means in dependence on the water content of the oil product, whereby the water content of the oil product may be maintained at a predetermined value permitting use thereof as a fuel.

7. Apparatus according to claim 6, wherein the solids separation means comprises a centrifuge.

8. Apparatus according to claim 6, wherein the solids separation means comprise a sieving machine.

9. Apparatus according to claim 6, wherein the means for supplying waste oil to the solid separation zone comprises a variable speed pump controlled by a continuous water content analyser arranged in the path of the oil product.

10. Apparatus according to claim 6, wherein the means for supplying water to the separator means comprises means for collecting and recycling water phase recovered from the separator means.

11. Apparatus according to claim 6, further including monitoring means for monitoring the recovery of water phase from the separator and flow control means for controlling the flow of intermediate oil product to the separator connected to the monitoring means, whereby in the event of "seal loss" in the separator means so that oil is discharged together with the water phase from the separator means the resulting increase in flow is detected by the monitoring means which in turn halts the flow of intermediate oil product to the separator means at least until the separator means is again operating normally.

12. Apparatus according to claim 6, further including sensing means for sensing the flow of intermediate oil product to the separator means and valve means for controlling the flow of waste oil to the solids separation means connected to the sensing means, whereby in the event of interruption of the flow of intermediate oil product downstream from the sensing means the valve means is actuated to shut off the supply of waste oil to the solids separation zone.

13. Apparatus according to claim 6, further including means for heating the intermediate oil product to be fed to the separator means.

14. Apparatus according to claim 6 further including means for heating the waste oil to be fed to the solids separation zone.

15. Apparatus according to claim 6, further including means for heating water to be supplied to the separator means.

* * * * *